United States Patent
Ganjyal et al.

(10) Patent No.: US 8,741,370 B2
(45) Date of Patent: Jun. 3, 2014

(54) EXPANDED PRODUCTS WITH HIGH PROTEIN CONTENT

(75) Inventors: Girish M. Ganjyal, Atchison, KS (US); Kyungsoo Woo, Shawnee, KS (US); Sukh D. Bassi, Atchison, KS (US); Clodualdo C. Maningat, Platte City, MO (US)

(73) Assignee: MGPI Processing, Inc., Atchison, KS (US)

( * ) Notice: Subject to any disclaimer, the term of this patent is extended or adjusted under 35 U.S.C. 154(b) by 669 days.

(21) Appl. No.: 11/115,441

(22) Filed: Apr. 27, 2005

(65) Prior Publication Data

US 2006/0210695 A1    Sep. 21, 2006

Related U.S. Application Data (60) Provisional application No. 60/663,339, filed on Mar. 18, 2005.

(51) Int. Cl.
*A23L 1/18* (2006.01)

(52) U.S. Cl.
USPC ............... 426/559; 426/560; 426/656

(58) Field of Classification Search
USPC .......................... 426/559, 560, 656
See application file for complete search history.

(56) References Cited

U.S. PATENT DOCUMENTS

| | | | |
|---|---|---|---|
| 3,852,491 A | 12/1974 | Malzahan et al. | |
| 3,873,748 A | 3/1975 | Schwab et al. | |
| 3,965,268 A | 6/1976 | Stocker et al. | |
| 5,610,277 A | 3/1997 | Bassi et al. | |
| 5,855,946 A | 1/1999 | Seib et al. | |
| 6,242,033 B1 * | 6/2001 | Sander | 426/559 |
| 6,299,907 B1 | 10/2001 | Seib et al. | |
| 6,461,656 B1 * | 10/2002 | Bindzus et al. | 426/242 |
| 6,664,389 B1 * | 12/2003 | Shi et al. | 536/102 |
| 7,235,276 B2 * | 6/2007 | Allen et al. | 426/549 |

* cited by examiner

*Primary Examiner* — Lien T Tran
(74) *Attorney, Agent, or Firm* — Lathrop & Gage LLP (57) ABSTRACT

High protein expanded products are produced by extrusion with unique blends of ingredients, such as wheat protein isolates, modified wheat starch, salts, gums and moisture. The mixture is extruded in a twin-screw extruder with the temperatures in the range of 50 to 140° C., screw speeds of 250 to 450 rpm and with a back pressure of 350 to 1200 psi for different recipes. A range of expanded wheat crisps and other expanded products with wheat protein contents ranging from 30 to 90% are obtained from this process. The expanded products have good cell structure with varying cell sizes when viewed under a microscope. This process can be used to develop a varied range of products such as, wheat crisps, wheat curls, wheat loops etc. The products may be used in nutritional or health bars and other comestible having a high protein and low carbohydrate content.

17 Claims, 6 Drawing Sheets

EXPANDED PRODUCTS WITH HIGH PROTEIN CONTENT

RELATED APPLICATION

This application claims benefit of priority to provisional application Ser. No. 60/663,339 filed Mar. 18, 2005, which is incorporated by reference to the same extent as though fully replicated herein.

BACKGROUND OF THE INVENTION

1. Field of the Invention

This invention pertains to expanded food products with high protein content and the method of making the same.

2. Discussion of the Related Art

It is problematic that current manufacturing practices are unable to accommodate certain food ingredients for use in making expanded food products which are suitable for certain needs. By way of example, such low carbohydrate diets as the popular Atkins diet and variations thereof have created a significant demand for food with high protein and reduced carbohydrates. It is a technological challenge to increase protein content in certain categories of traditional foods, particularly in expanded products such as breakfast cereals and crispy snacks. Expanded food products are traditionally made using extrusion technology and contain a significant amount of starch to accommodate proper expansion. The starch generally imparts desired organoleptic qualities in the final food product.

Starches have unique properties, for example, facilitating the formation of continuous films under extrusion conditions. The physico-chemical nature of starch benefits the expansion of food products by forming a good cell structure matrix with correspondingly favorable texture in the final expanded products. Extrusion becomes more difficult, however, when ingredients such as proteins, dietary fibers and lipids are added. It is difficult to expand proteins without denaturation in extrusion processing because protein materials are molecularly less amenable to expansion that derives from the high temperature and pressure of extrusion processing. In particular, wheat gluten protein has an elastic nature that resists expansion and texturizes easily.

Extrusion processing has long been used to manufacture expanded food products, but the problem of obtaining non-soy high protein content has not been resolved. In one example, U.S. Pat. No. 3,873,748 issued to Schwab et al. describes a method to make ready-to-eat flake cereal by cooking, extruding, drying and grinding a basic cereal matrix and then blending the resulting product with sodium caseinate, rewetting the mixture and extruding to form pellets, and finally using high pressure rolls to create the flakes. The resulting cereal contains up to 25 percent (25%) protein, which is rather low.

Some success has been obtained using soy proteins. U.S. Pat. No. 3,852,491 issued to Malzahan et al. describes the use of high temperature/high pressure (HTHP) extrusion to produce an expanded cereal containing up to fifty-five percent (55%) soy protein. Soy protein isolate having up to 80% protein was processed at temperatures in the range of 220° F. to 355° F. and at pressures in the range from 1000 to 3000 psig. A product having a stringy or protein fiber-like texture developed when the temperature of the extruded dough mass reached 355° F. or higher. Cereal-like textures were observed only at lower temperatures. This fiber-like texture that is obtained indicates the texturization process.

U.S. Pat. No. 3,965,268 issued to Stocker et al. describes an expanded soy food product that is obtained by extrusion with heating of a mixture containing an organic compound and water with passage from a high pressure zone to a low pressure zone. The product has an open cell structure and could be used as a meat substitute, convenience food or pet food ingredient. A sulfur-containing organic material provides functional expansion benefit when added to the mixture in an amount ranging from 0.2 to 0.6% by weight of the proteinaceous material. The sulfur-containing organic material includes sulfur-containing amino acids, lower alkyl mercaptans, lower alkyl sulfides, lower alkyl disulfides, thioacids, or their salts.

U.S. Pat. No. 6,242,033 B1 issued to Sander et al. describes an extrusion process for making expanded high-protein cereal. Tuber starch, such as tapioca, is used as an expanding agent. The products contained protein levels of 50% to a maximum of 70%. Specific recipes were disclosed, largely using rice flour and tapioca flour and soy protein isolates with the protein levels between 50% and 62%.

If carefully observed all the methods deal with extrusion processing of recipes which have a significant amount of starch, which is a critical component in expansion of the product. Expansion of starches during extrusion also requires a proper balance of water content with other ingredients and proper extrusion conditions as are known generally in the art to obtain a good stable expansion. The unique molecular properties of starches aid in their expansion. They form continuous films when extruded, which helps to form very good complete cell structure when extruded.

Extrusion becomes difficult when other ingredients such as proteins and lipids are added into the recipes. Unmodified proteins, when extruded with starches, disperse into the matrix of starch. Then the product property may entirely depend on the extent of dispersion of the proteins into the starch matrix.

When regular unmodified proteins are used, it is difficult to extrude them, as it takes more energy to break the disulfide bonds and arrange them properly in a streamline. For example, when vital wheat gluten is used in large amounts in the production of bread dough or other products, the dough becomes too strong and is difficult to process during mixing, shearing, kneading and molding. In particular, the elasticity of wheat-based proteins tends to collapse such products after expansion.

Most of the high protein products that have been developed include soy as a main source of protein. During the extrusion process soy proteins are easier to work with, although if high levels of soy proteins are used, they adversely affect flavor and give unacceptable volume and crumb grain properties.

Wheat gluten is a binary mixture of gliadin and glutenin. These components can be separated by alcohol fractionation or by using a non-alcoholic process (as disclosed in U.S. Pat. No. 5,610,277) employing the use of organic acids. Gliadin is soluble in 60-70% alcohol and comprises monomeric proteins with molecular weights ranging from 30,000 to 50,000 Daltons. These proteins are classified as alpha-, beta-, gamma-, omega-gliadins depending on their mobility during electrophoresis at low pH. Gliadin is primarily responsible for the extensible properties of wheat gluten. Glutenin is the alcohol insoluble fraction and contributes primarily to the elastic or rubbery properties of wheat gluten. Glutenin is a polymeric protein stabilized with inter-chain disulfide bonds and made up of high-molecular weight and low molecular weight subunits. Generally, glutenin exhibits a molecular weight exceeding one million daltons. Preferred fractionated wheat protein products comprise at least about 85% by weight protein, and more preferably at least about 80% by weight of glutenin, all proteins expressed on N×6.25, dry basis.

Wheat protein isolates are generally derived from wheat gluten by taking advantage of gluten's solubility at alkaline or acidic pH values. Wheat gluten is soluble in aqueous solutions with an acidic or alkaline pH and exhibits a classical "U-shaped" solubility curve with a minimum solubility or isoelectric point at a pH 6.5-7.0. By dissolving the gluten, proteins can be separated from non-protein components by processes like filtration, centrifugation, or membrane processing followed by spray drying. Alternatively, wet gluten from wet processing of wheat flour can be repeatedly kneaded, water washed, and dewatered to get rid of contaminating starch and other non-protein components, and subsequently flash dried. These techniques yield a wheat protein isolate product with elevated protein content that is usually at least about 85% by weight, and more preferably at least about 90% by weight (on a N×6.25, dry basis). Wheat protein isolates are less elastic but more extensible than wheat gluten. Examples of preferred wheat protein isolates include, Arise™ 3000, Arise™ 5000, Arise™ 6000 and Arise™ 8000 available from MGP Ingredients, Inc., Atchison, Kans.

Wheat protein concentrates are proteinaceous compositions which preferably have protein contents of at least about 70% by weight, and preferably at least about 82% by weight (N×6.25 dry basis). Wheat protein concentrates may be of different varieties manufactured by a number of different methods. Vital wheat gluten is one type of wheat protein concentrate that has a protein content of at least about 82% by weight (N×6.25, dry basis). Vital wheat gluten is a viscoelastic protein manufactured by a flash drying method. Additional types of wheat protein concentrates are manufactured by dispersing wet gluten in an ammonia solution followed by spray drying. These wheat protein concentrates exhibit lesser viscoelastic properties than vital wheat gluten but tend to be more extensible. Examples of the latter type of wheat protein concentrates include FP 300, FP 600 and FP 800 available from MGP Ingredients, Inc. of Atchison, Kans.

Native starch has often been modified to satisfy specific needs for food manufacturers. Chemical modifications, such as hydroxypropylation, cross-linking, and oxidation are commonly used to enhance shear, temperature, and acidic processing stability, to improve freeze and thaw stability, and to increase paste clarity and stability. Starch undergoes structural changes during chemical modification in some of its glucopyranosyl units in the molecule.

Hydroxypropylated starch is formed by reaction with propylene oxide normally at very low levels of substitution. Substituted hydroxypropyl groups restrict interaction of starch chains and prevent junction zone formation. Without cross-linking, however, hydroypropylated starch tends to swell excessively during cooking and form a stringy paste that is unstable against high shear and acidic processing. Combination of hydroxylpropylation and cross-linking is an efficient method of modification to improve storage stability. This type of starch includes Midsol™ 46, available from MGP Ingredients.

Oxidation of starch by an oxidizing agent such as sodium hypochlorite is well known. During the oxidation reaction, hydroxyl groups on starch molecules are oxidized to carbonyl and carboxyl groups. Cleavage of some of the glycosidic linkages also occurs, which decreases molecular weight of starch. Oxidized starch granules tend to swell at lower temperature to a greater extent than unmodified starch. Other characteristics of oxidized starch include low and stable viscosity, forming gel of high clarity, and improved binding and film forming properties. Midsol™ Krisp, available from MGP ingredients, is categorized as this type of starch.

Some dietary starches resist digestion by α-amylase in the human upper gastrointestinal tract and are termed as resistant starch (RS). RS is recognized as a type of dietary fiber and is of particular interest with respect to its health benefits against colon cancer. A high level of RS in starchy food constitutes a diet with a low glycemic index, which is thought to be beneficial for all individuals, especially for type II diabetics. A certain degree of cross-linking on granular starch leads to the formation of resistant starch, for example, as reported in U.S. Pat. No. 5,855,946 issued to Seib et al., and limits the digestion by α-amylase. This type of starch is supplied by MGP Ingredients and is commercially available as FiberSym™ 70 and FiberSym™ 80-ST.

Functional characteristics of resistant starch may be modified by preswelling of granular starch before cross-linking, for example, as described in U.S. Pat. No. 6,299,907 issued to Seib et al. The preswollen and cross-linked starch granules are capable of undergoing multiple hot or cold water swelling cycles without losing the individuality of starch granules. Reversibly swellable starch products may be modified further by an oxidizing agent. Oxidized reversibly swellable starch products are characterized by improved hydrophilic surface properties without undue agglomeration or clumping. Oxidized reversibly swellable starch displays stability improvement with hydrophilic polymers such as hydrocolloids and proteins.

SUMMARY

The present instrumentalities overcome the problems outlined above and advance the art by providing, for example, a high protein expanded food product together with apparatus and methodology for making the expanded food product.

Purified and/or modified proteins may be combined with starch in recipes that are rich in protein content. These ingredients may be subjected to extrusion processing to form a low density expanded food product, for example, one having good expanded cell structure, and a density ranging from about 0.1 to 0.4 g/cc.

By way of example, high protein expanded products are produced by extrusion with unique blends of ingredients including protein isolates, modified starch, salts, gums and moisture. The mixture of ingredients is extruded in a twin-screw extruder with the temperatures being in the range of 50° C. to 140° C., with screw speeds of 250 to 450 rpm and with a back pressure of 350 to 1200 psi for different recipes. A range of expanded food products, such as crisps, curls, loops and the like, may be obtained from this process. The protein content is preferably majority wheat protein and may be entirely wheat protein. Protein contents may range, for example, from 30% to 75% by weight of the dry extruded product, and are preferably from 65% to 70%. Some products may include up to 75% by weight protein, but beyond this limit the quality of expanded cell structure in the final product deteriorates and the organoleptic quality of texture is impaired. Products having majority or exclusive protein contents or up to 40%, 50%, 60%, 70%, or 75% by weight may be produced in any combination with product densities generally in the range of 0.1 to 0.4 g/cc, e.g., 0.1, 0.15, 0.20, 0.25, 0.30, 0.35, or 0.4 g/cc. The expanded products have well developed porous cell structure of varying sizes when viewed under a microscope. The products may be used in, among other products, cereals, snacks, or other high protein low carbohydrate products. It is also contemplated that the products may be incorporated with a blend of other ingredients, for example, to form a bulky, crunchy constituent in an admixture that is used to form nutritional or health bars.

In some embodiments, a wheat protein blend is particularly preferred and may be provided as a wheat protein concentrate or isolate. A minority fraction of other protein may be mixed with the wheat protein, for example soy, rice, whey, corn or potato protein. The proteins used are preferably isolates with high protein content. Other ingredients may include native or modified starches derived from wheat, corn, tubers etc. These starches may be replaced by flour with high starch content, such as wheat flour, potato flour and/or tapioca flour. Minor ingredients such as salts, leavening agents, gums and sulfur-containing products in low concentrations are typically incorporated to aid in expansion of the product. A minor quantity of any food grade gum such as Methocel gum can be added to increase the strength of the dough melt. The use of sulfurous material, especially sulfides, is feasible and may benefit the product, but is less preferred due to a possibility of adverse reactions in consumers who are sensitive to such materials.

The process used is a high temperature, high pressure, high shear, short time cooking system that is also known in some circumstances as extrusion cooking. A special twin screw profile, die designs and optimum extrusion conditions may be used to obtain the desired products in optimal form.

DETAILED DESCRIPTION OF THE DRAWINGS

Figure 1:
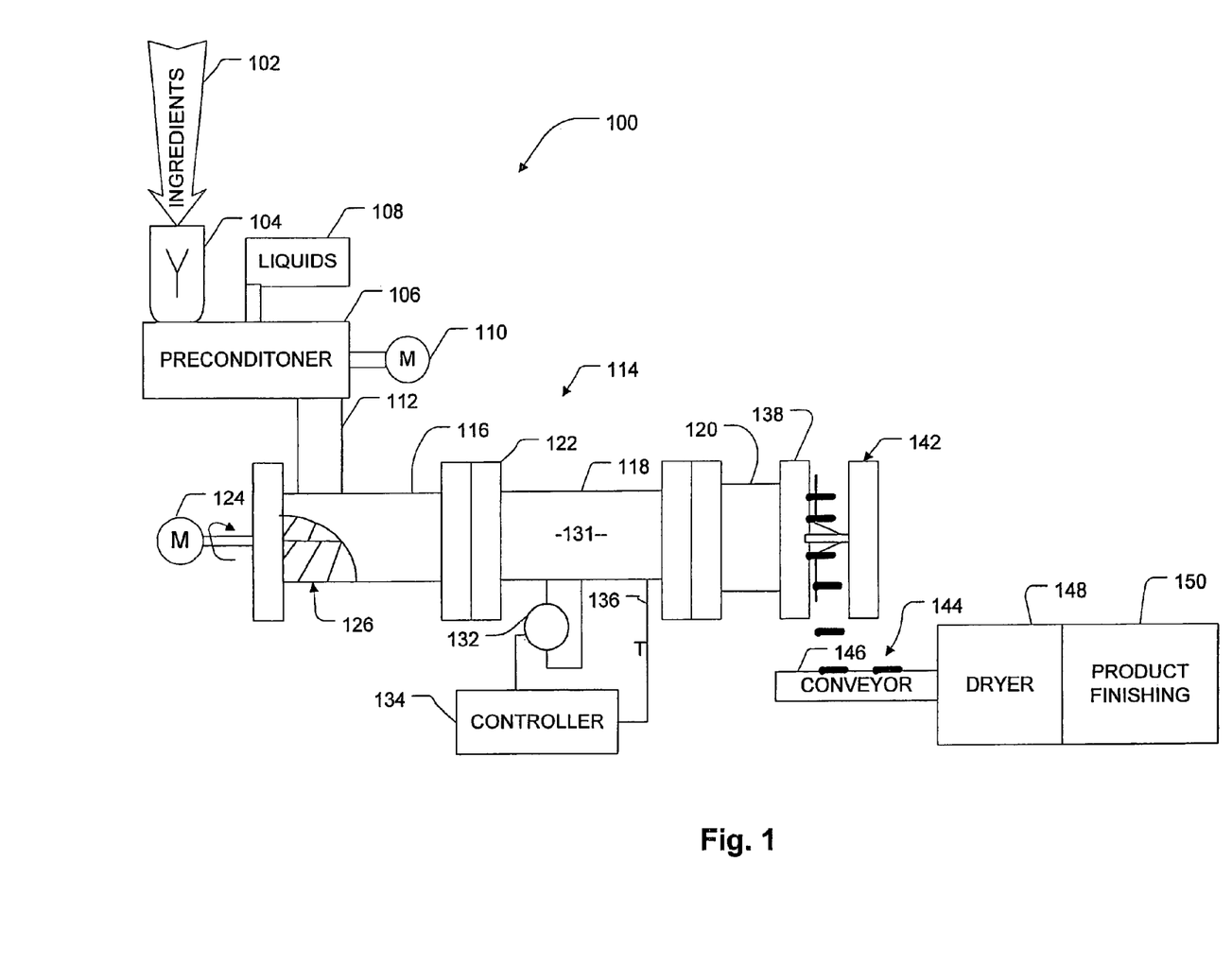
FIG. 1 depicts a process equipment schematic illustrating an extruder system for producing high-protein crisps.

There will now be shown, by way of example and not by limitation, an extrusion processing system 100 according to FIG. 1. The extrusion processing system 100 may be used to produce low-density expanded food products that have a high protein content and a well developed expansion cell structure. By way of example, one type of commercially available extruder that may be adapted for use in extrusion processing system 100 is the model TX57™ extruder from Wenger Manufacturing, Inc. of Sabetha, Kans. The particular type of extruder system in use may be scaled up or down, for example, in a scale-up to larger systems, such as the Wenger model TX85™ or TX144™ extruder. A recipe of ingredients 102 passes through a hopper 104 and into a preconditioner 106. The ingredients may be dry, in which case liquids 108 also pass into the preconditioner 106. The preconditioner 106 may contain, for example, a conventional single screw (not shown) fitted with paddles to assist mixing of the ingredients that is actuated by motor 110. The mixture of ingredients passes from the preconditioner 106 through tube 112 and into extruder barrel 114.

The extruder barrel 114 may include a plurality of cylindrical head sections, such as sections 116, 118, 120. The respective cylindrical head sections are joined by flanges, such as flange 122. An actuator, such as motor 124, rotates a dual screw assembly 126, which is shown in broken view through cylindrical head section 164. Counter-rotation of the screws 128, 130 of twin screw assembly 126 subjects the ingredients 102 to internal extrusion processing within the extruder barrel 114.

It will be appreciated that thermal process control is improved by the use of jacketed cylindrical head sections 116, 118, 120, to control temperature in respective zones. For example, cylindrical head section 118 may constitute one such zone 131 in which a pump 132 under control of controller 134 circulates refrigerated coolant in response to a sensed temperature T from thermocouple 136. The thermocouple 122 may penetrate cylindrical head section 118 to contact ingredients 102 as they are being processed, while the coolant (not shown) is circulated within jacket 138 and does not contact ingredients 102. In like manner, each of the cylindrical section heads 116, 118, 120 may be allocated into one or more cooling zones depending upon the nature of jacketed construction.

Cylindrical head section 120 terminates in a die assembly 138, which shapes extruded ingredients 140, which are cut by cutter assembly 142 to form expanded product segments 144 falling on conveyor 146. The expanded product segments 144 may be in any form that may be produced through a die extrusion process, such as crisps, loops, or belts. Expansion of expanded product segments 144 occurs because the internal working pressure inside cylindrical head section 120 is greater than ambient pressure outside cylindrical head section 106, and this circumstance flashes the expanded product 140 when extruded ingredients 140 exit the die assembly 138. The ensuing expansion of volatile components creates a suitable cell structure in the expanded ingredients for use as an expanded product. In turn, conveyor 146 advances the expanded product segments 144 into dryer 148 and product finishing machinery 150. By way of example, the dryer 148 may operate at 70° C. to 90° C. for 6 to 10 minutes. The product finishing machinery 150 may include any type of product finishing machinery known in the art. By way of example, the product finishing equipment 150 may include a fluidized bed that is used to coat the expanded product segments 144 with flavorings, bulk packaging equipment, retail product packaging equipment, and downstream processing equipment that uses the expanded product segments 144 as an ingredient for other products.

Figure 2:
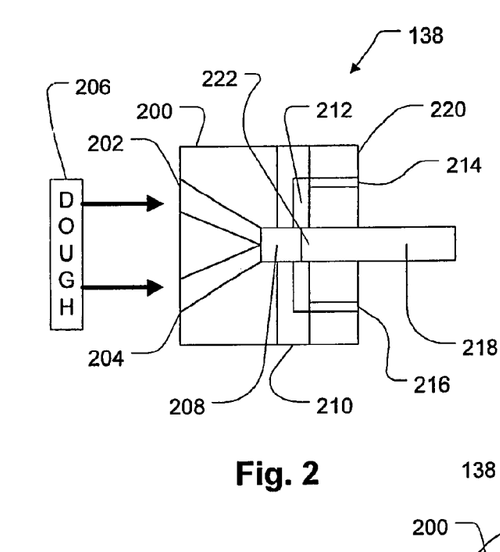
FIG. 2 provides additional detail with respect to a die assembly used in the process equipment.

FIG. 2 is a midsectional view that provides additional detail with respect to die assembly 138 which, for example, may be in a configuration used to make wheat crisps according to the dimensions discussed. As shown in the embodiment of FIG. 2, the die assembly 138 may contain 2 to 1 Y-adapter 200 that contains channels 202, 204 communicating dough 206 to a central opening 208 that itself communicates into breaker plate 210. The central opening 208 of breaker plate 210 separates the adapter from die plate 220 as an interim space communicating the channels 202, 204 with extrusion holes 214, 216. The central opening has a diameter and an axis that is normal to the diameter between the adapter 200 and the die plate 220, where the diameter and the axis are sufficient to avoid premature expansion of dough 206 prior to passage through die plate 220. Depending upon process flow conditions, the run of the diameter may, for example, be at least ten times larger than the run of the axis, or this may be twenty or thirty times larger. A cylinder 218 is positioned into die plate 220.

Figure 3:
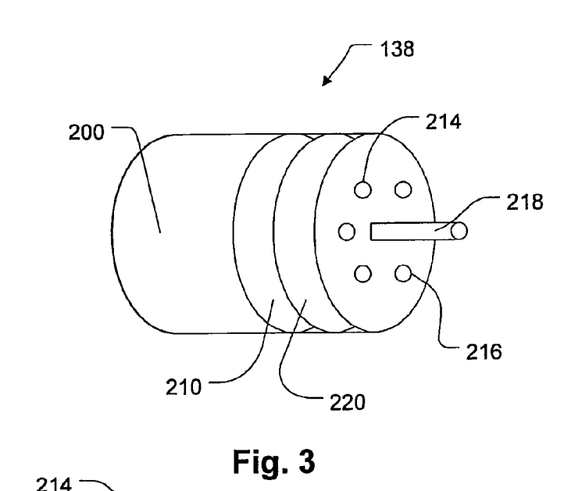
FIG. 3 provides additional detail with respect to the die assembly.

FIG. 3 shows die assembly 138 in perspective view. By way of example, the holes 214, 216 might include 10 to 30 small openings in size from 1.5 to 4 mm, depending on the desired product nature when the interior opening 208 has a diameter of about 1 centimeter. It is generally the case that as holes 212, 214 increase in size the number of holes should be correspondingly reduced, and the number of holes may be increased when the holes have a smaller diameter. This is to provide a flow restriction that increases the backpressure to facilitate expansion downstream from die assembly 126.

Figure 4:
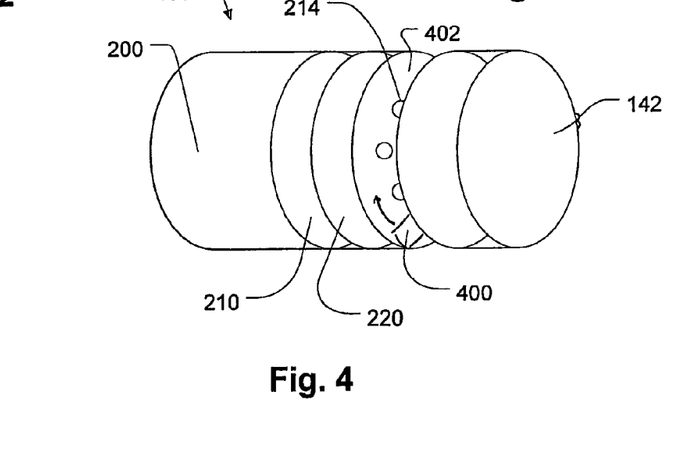
FIG. 4 provides additional detail with respect to the die assembly.

FIG. 4 shows the die assembly 138 with cutter 142 installed on cylinder 218 to sweep blade 400 across face 402 of die plate 220 for cutting of extrudate.

Figure 5:
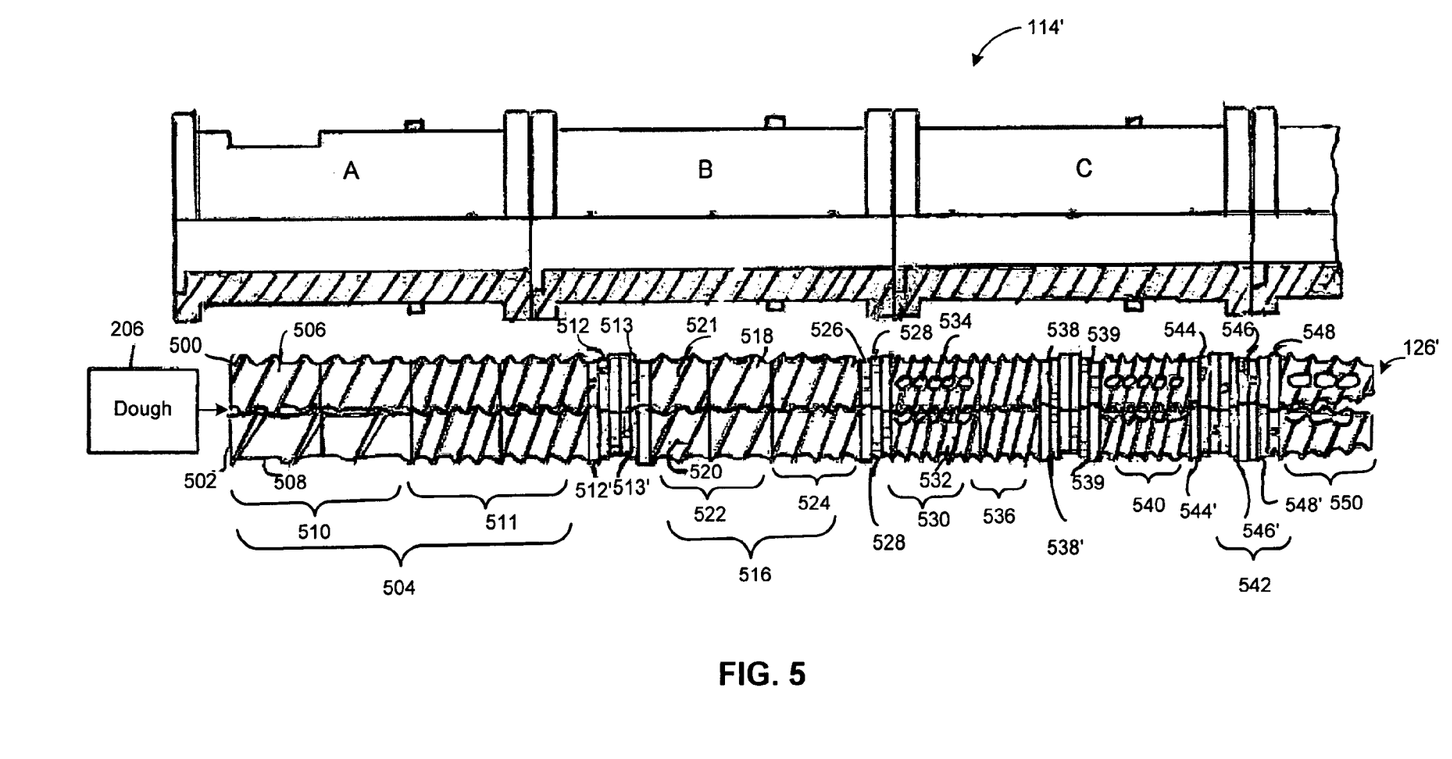
FIG. 5 shows a twin screw assembly for use in the process equipment.

FIG. 5 provides additional detail with respect to one embodiment of extruder barrel 114 for use as shown in FIG. 1. This embodiment is shown in FIG. 5 as extruder barrel 114' in an assembly view with respect to screw assembly 126'. The configuration as shown is particularly preferred for use in processing ingredients that are high in protein, especially wheat gluten. The various screw elements may be purchased on commercial order, for example, from Wenger Manufacturing of Sabetha, Kans., and assembled as shown in FIG. 5. Conventional screw elements that are in use on Wenger extruders and which may be included in the screw assembly 126' include, for example, conveying screw sections, cut-flight screw sections, forward lobes, reverse lobes, neutral lobes. The various sections A, B, C shown in FIG. 5 are arranged to provide good mixing and cooking of a dough mixture with high protein content, such that the starch gelatinizes and forms a film, but the protein is not texturized and is dispersed uniformly in the starch. These goals may be accomplished in the extruder profile set-up for expanded products by use of a simplified screw assembly that makes limited use of cut-flight screws and reverse lobes. Thus, the barrel length, for wheat products in particular, may be shorter than for most conventional set-ups. Section A may, for example, correspond to section 116 of FIG. 1 and the remaining sections B and C may be added in sequence.

Dual screw assembly 126' is a twin screw assembly formed of screws 500, 502. A first mixing/conveying section 504 resides beneath mixer-preconditioner 112 (see FIG. 1) and includes an offset mixer arrangement where screw 500 has approximately two flights 506 for each flight 508 on screw 502 over interval 510. This interval 510 accepts dough 206 from the preconditioner 106 (shown in FIG. 1) and completes the mixing process. The remainder 511 of mixing/conveying section 504 is generally a conveying section that is equally flighted on opposed screws 500, 502, for example, as a ½ pitch conveying section, towards a forward lobe 512 and a reverse lobe 513 on screw 500. The lobes 512, 513 are opposed to complimentary lobes 512', 513' on screw 502 such that forward lobe 512 is opposed to reverse lobe 512' and reverse lobe 513 is opposed to forward lobe 513'. The lobes 512, 512', 513, 513' provide resistance to flow of dough 206 to assure good working and mixing over mixing/conveying section 504.

A second conveying section 516 provides conveying, compacting and some additional mixing between equivalently flighted sections 518, 520. Sections 518, 520 each have relatively open flights 521 proximate reverse lobe 513, such that the ratio of flights is approximately 4:5 comparing interval 522 against the remainder 511. In the interval 524, flights 526 narrow to approximate the same spacing that persists over the remainder 511. In effect, the flighting on interval 522 is widened to gather, compact and convey ingredients after the chocking effect of forward lobe 512 and reverse lobe 513, while the flighting on interval 524 is narrowed to provide additional working force against forward lobe 528 and reverse lobe 528'. The lobes 528, 528' provide flow resistance for increased upstream compacting effect in conveying section 516.

A working section 530 contains opposed equivalently spaced offset cut-flights 532, 534. By way of example, these may be cut flights having a 0.75 inch pitch. Working section 530 imparts shear to work the dough 206. The use of cut-flights in this position imparts significant working effect that tends to break-down gluten bonds. The flights 532, 534 on working section 530 are spaced more narrowly together than are flights 526 over interval 524, for example, to compare in an approximate axial run ratio of 3:2. This is followed by conveying section 536, which carries the dough 206 towards forward lobe 538 and reverse lobe 539, which are opposed to reverse lobe 538' and forward lobe 539'. Lobes 538, 538', 539, 539' provide resistance to assure good upstream working conditions. A second working section 540 repeats the cut-flight arrangement of working section 530 and passes dough 206 to a lobe system 542 including sequentially a forward lobe 544, reverse lobe 546, and forward lobe 548. These lobes 544, 546, 548 on screw 500 are opposed to complimentary lobes including reverse lobe 544', forward lobe 546', and reverse lobe 548' on screw 502. The lobe system 542 discharges the dough 206 into cone section 550, which passes dough 206 to die assembly 138 for extrusion of ingredients as shown in FIG. 1.

It will be appreciated that working section 530 primarily works the dough 206 and conveying section 536 primarily conveys the dough 206, although there is some overlap of functionality between the sections 530, 536. The action of conveying with significantly less work in the conveying section 536 gives the dough time to relax during which intermolecular bonds may be established. This relaxation may be enhanced by the insertion of an additional conveying section (not shown) where the lobes 544, 546 may be replaced with an additional length of conveying section 536. This substitution does two things. First, the additional conveying time permits the dough 206 to undergo increased relaxation. Second, elimination of lobes 544, 544', 546, 546' imparts less work to the relaxed dough. This concept benefits dough with increased protein contents, for example, when the protein content exceeds 60% by weight.

Figure 6:
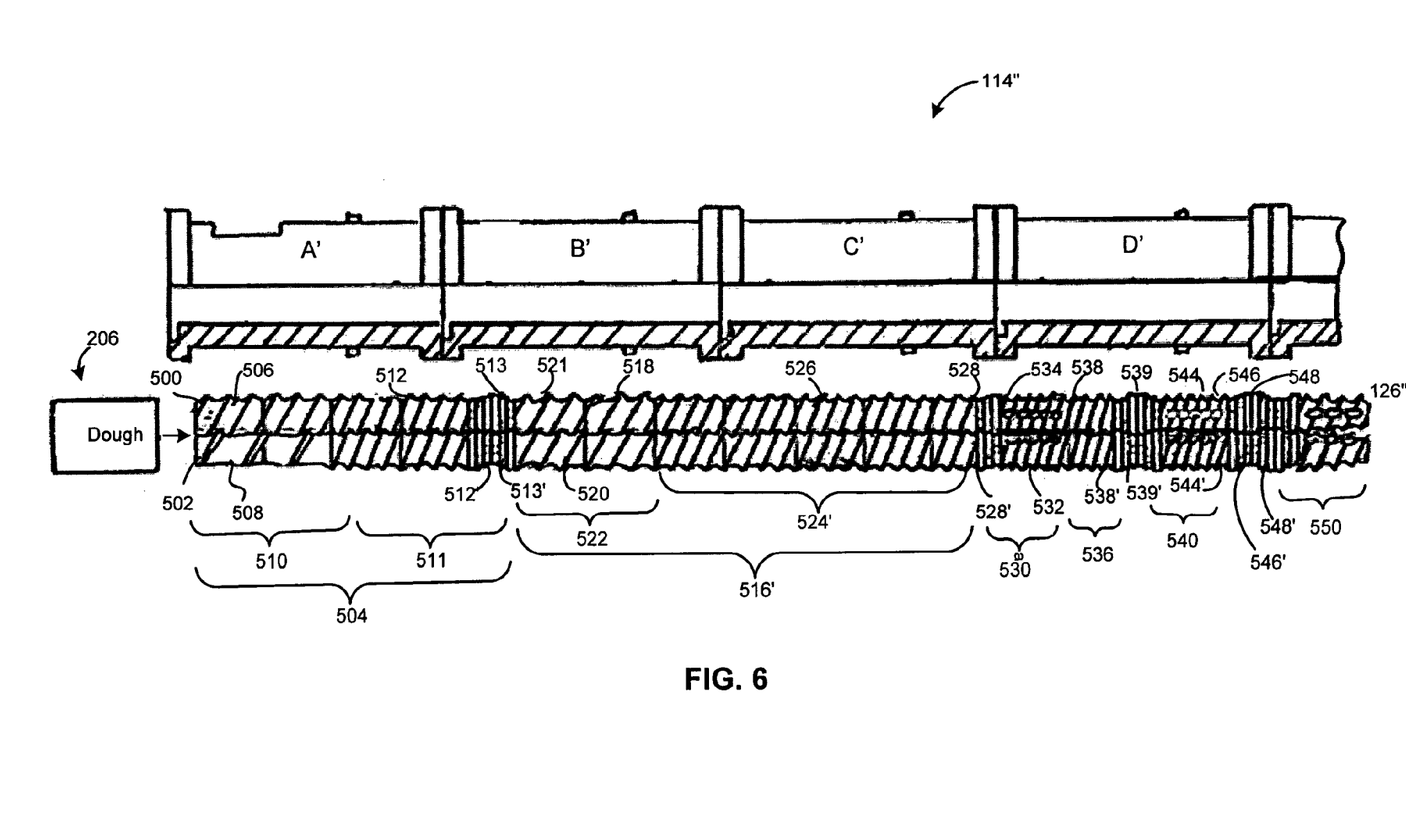
FIG. 6 shows a twin screw assembly for use in the process equipment.

FIG. 6 provides additional detail with respect to one embodiment of extruder barrel 114 for use as shown in FIG. 1. This embodiment is shown in FIG. 6 as extruder barrel 114" in an assembly view with respect to screw assembly 126". The various sections A', B', C', D' shown in FIG. 6 are arranged to provide good mixing and cooking of a dough mixture with high protein content, such that the starch gelatinizes and forms a film, but the protein is not texturized and is dispersed uniformly in the starch. These goals may be accomplished in the extruder profile set-up for expanded products by use of a simplified screw assembly that makes limited use of cut-flight screws and reverse lobes. Thus, the barrel length may be shorter than for most conventional set-ups. Section A' may, for example, correspond to section 116 of FIG. 1 and the remaining sections B', C' and D' may be added in sequence. Screw assembly 126" is identical to screw assembly 126' of FIG. 5, except a conveying section 516' includes a longer run in interval 524', to permit enhanced dough relaxation as compared to conveying section 516 over interval 524 in FIG. 5.

It will be appreciated that dough 206 may have relatively high or relatively low protein contents within the prescribed range, and that doughs with higher protein content must be worked differently than doughs with lower protein contents. This may be done, for example, by extending the length of conveying section 516' as shown in FIG. 6 to afford relatively more relaxation time to dough with higher protein content. The shorter run of conveying section 516 is amenable to dough with lower protein content. Alternatively, the interval 516 could have been extended with additional cut flight sections, such as cut flights 532, 534. These cut flights impart a tremendous amount of working of the dough 206 and may be added for lower protein content doughs. In this manner, the precise construction of the screw assembly 126 may be adjusted on an empirical basis to impart proper working of the dough that is appropriate to any given recipe on the basis of protein and/or starch content.

Operation of the screw assembly 126 and the die assembly 138 in extrusion system 100 may provide significant benefits as compared to the prior art. The high protein dough is worked properly to avoid texturization while allowing good mixing and cooking. This is done in part by using conveying screw elements on interval 536 to relax the dough intermittently between the cut flight intervals 530, 540 and the lobe interval 542, all of which work the dough 206. Dough 206 exiting from cone section 550 passes through the die assembly 138. The die assembly 138 complements the screw assembly 126 for these purposes by avoiding long transitions or venturis that are typically used to make texturized products. The dough passes to the Y-adapter 200 for passage through the openings 202, 204 and eventually through the respective openings 214, 216 in die plate 220. By way of example, the die assembly 138 as shown and described is set up to form wheat crisps, which are generally small spheres with diameters ranging from 2 mm to 6 mm.

Die assembly 138 may be changed to form curls, loops or roll products by providing fewer openings than for the wheat crisps. Technical differences may exist between system set-ups for extruding crisps versus other forms of shaped extrudate, such as curls, loops, and rolls. Wheat crisps are relatively small, whereas the curls, loops and rolls are increasingly larger in size. The larger forms utilize a correspondingly larger die opening, so there is less system backpressure at the die assembly 126. The use of lower backpressure makes the product more difficult to expand. Expansion is also more difficult with higher protein content. Where the extruded product has a diameter of more than about 1 to 1.5 centimeters, it is increasingly difficult to extrude product having good overall appearance and superior organoleptic qualities as protein content rises much above the level of 60% by weight.

A recipe may include, for example, protein, such as wheat protein concentrate, wheat protein isolate, e.g., with protein contents between 85% to 95%, such as Arise 5000, 6000, 8000 and Gliadin. Hydrolyzed wheat gluten such as HWG2009 from MGP Ingredients may also be used. The hydrolyzed wheat gluten has a protein content greater than 75% (N×5.7 db) and softens the dough mixture while increasing the extensibility of the dough. Starch may include a modified starch with the ability to maintain product crispness and stability such as Midsol Krisp™, Midsol 46™; or unmodified starch such as Regular Midsol 50™, potato starch, rice starch, corn starch or tapioca starch; or a starch-containing flour such as wheat, potato, rice, or tapioca flour. Modified RS starch, such as such as FiberSym70™ and FiberSym80™, may be added to increase total dietary fiber (TDF) of the recipe. Leavening agents, such as calcium aluminum phosphate, may be added. Dough softeners and strengtheners such as cellulose methyl-cellulose (CMC), sodium stearoyl-2-lactylate (SSL), polysorbate 60 etc. may be added. Antioxidants, such as, BHA, BHT or TBHQ, may be added within levels that are permitted in context of Food and Drug Administration regulations.

It will be appreciated that the starch may be provided as flour that has a high starch content and so may be used to replace the starch. By way of example, such flours include wheat, potato, and tapioca flour.

The ingredients may be premixed in a blender and fed into the extruder mixer/preconditioner 106 where moisture may be added, such as from 15% to 20% by weight of the ingredients, to provide a total moisture content ranging from about 25% to 30% by weight when the in situ water content of dry flour and starch is also considered. The ingredients are introduced into the extruder barrel, which may be formed in any number of sections 116, 118, 120 and operated in a predetermined sequence of temperatures, for example, as described in the recipes below. The temperature preferably increases along the length of the extrusion barrel. Where the protein content is less than about 40%, the late stages of extrusion are preferably at about 100° C. or less to avoid defunctionalizing the starch. Higher protein contents benefit from the use of higher temperatures, such as late stage temperatures of 110° C. or 120° C. As the dough passes though the extruder, it is mixed well and cooked to a desired level.

Passage through die assembly 126 provides a desired shape and texture. Drying of the extruded product in dryer 134 imparts a final moisture level of 5 to 8%, whereupon the product may be bagged or subjected to other downstream processing. Products reported in the examples below had low density, good uniformity, and good cell structure, which imparts a crisp texture in the product.

Wheat crisps with protein contents ranging from 40 to 70% have been developed according to working examples set forth below. These examples set forth preferred materials and methods and should not be narrowly construed. Along with the wheat crisps, curls and loops/rolls were developed with protein contents in the range of 30 to 70%. For wheat crisps, generally the protein content can be as much as 75% with excellent cell structure and texture. For other expanded food products, for example, including wafers, loops, rolls, and the like, the protein content may be less, such as up to 60% or 65% protein, in which case the remainder of the recipe contains additional starch to compensate for less protein. In this context, the starch may be any starch, such as high expanding starch, oxidized starches, etc.

Wheat protein isolates such as Arise™ 5000, 6000 and 8000, which are products of MGPI, and modified starches such as Midsol Krisp™, Midsol 46™, FiberStar™ 70 and 80, SRS™ and Oxy-SRS™, which also are products of MGPI were used. Any other wheat protein isolates which would have a proper blend of gliadin and glutenin to provide the right amount of extensibility and elasticity to give proper strength to the expanding dough melt in the extruder may be used in the same manner. Other starches which have good expansion ability can be used.

Other minor ingredients used were salts that may generate expansion gas or prevent caking or clumping of dough, e.g., calcium carbonate (CaCO3) or sodium bicarbonate along with sodium aluminum phosphate, calcium aluminum phosphate or sodium aluminum sulfate. These minor ingredients may be used, either alone or in combinations, as an aid to expansion by way of releasing carbon dioxide. Any other salts which can aid in expansion can be used. Along with the above ingredients, a minor quantity of any food grade gum such as Methocel gum may be added to increase the strength of the dough melt. Different dough softeners that are commonly used in the commercial baking industry, such as SSL and/or Datem, may be used to assist the expansion of higher protein crisps by making the high protein dough softer. The concentrations of minor ingredients may vary as a matter of product formulation.

Vinegar is preferably but optionally added, and especially improves flow of the dough through the extruder when the dough contains higher protein levels above 60%. Again, vinegar is a preferred ingredient at these higher protein levels, but not a necessary one that must be used in all embodiments.

EXAMPLE 1

Wheat Protein+Modified Wheat Starch

A. Extrusion Conditions

Extrusion Profile: #2

Extrusion Temperature in cylindrical head sections 102, 104, 106, and die assembly 126: 47-47-79-74° C.

Extrusion Pressure: 5460.2 kPa

Extrusion Motor Load: 85%

Extruder Speed: 385 rpm

Water was added to the dry mix during extrusion through the extruder barrel. The dry feed rate ranged from 105 to 130 kg/hr, and water feed rate ranged from 10 to 26 kg/hr. Vinegar was fed into the extruder preconditioner at approximately 2 kg/hr.

| B. Recipe | |
|---|---|
| Ingredient | Percent Wt. |
| Arise 8000 ™ | 50 |
| Midsol Krisp ™ | 48.61 |
| Sodium Bicarbonate | 0.5 |
| Sodium Aluminum Phosphate | 0.25 |
| Sodium Aluminum Sulfate | 0.25 |
| Calcium Aluminum Phosphate | 0.25 |
| CoviOx ™ (Vitamin E) | 0.14 |
| Water | 15% |
| Vinegar | 2% |

| C. Final Product Properties | |
|---|---|
| Property | Value |
| Moisture Content | 2.31 |
| Bulk Density (g/cc) – (lb/ft³) | 0.1249-7.8 |
| Protein (N × 6.25 as is) | 42.66 |
| TDF | 1.1 |

EXAMPLE 2

Wheat Protein+Modified Wheat Starch

A. Extrusion Conditions

Extrusion Profile: #2

Extrusion Temperature in cylindrical head sections 102, 104, 106, and die assembly 126: 45-91-95-98° C.

Extrusion Pressure: 6190 kPa

Extrusion Motor Load: 60%

Extrusion Speed: 325 rpm

Water was added to the dry mix during extrusion through the extruder barrel. The dry feed rate ranged from 105 to 130 kg/hr, and water feed rate ranged from 10 to 26 kg/hr. Vinegar was fed into the extruder preconditioner at approximately 2 kg/hr.

| B. Wheat Crisp Recipe | |
|---|---|
| Ingredient | Percent Wt. |
| Arise 8000 ™ | 60 |
| Midsol Krisp ™ | 38.296 |
| Sodium Bicarbonate | 0.5 |
| Sodium Aluminum Phosphate | 0.25 |
| Sodium Aluminum Sulfate | 0.25 |
| Calcium Aluminum Phosphate | 0.25 |
| BHA | 0.002 |
| BHT | 0.002 |
| Water | 15% |
| Vinegar | 2% |

| C. Final Product Properties | |
|---|---|
| Property | Value |
| Moisture Content (% wb) | 2.63 |
| Bulk Density (g/cc) – (lb/ft³) | 0.141-8.790 |
| Protein (N × 6.25 as is) | 57.29 |
| TDF (%) | 1.1 |

Figure 7:
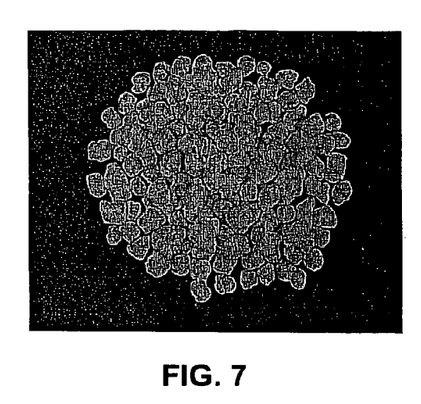
FIG. 7 depicts an assemblage of wheat crisps.
Figure 8:
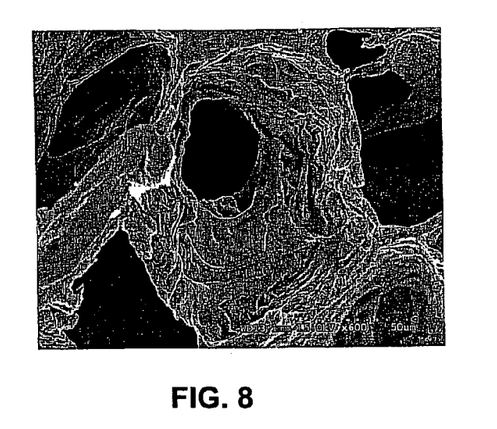
FIG. 8 depicts a scanning electron microscope picture of the cell structure of a wheat crisp.
Figure 9:
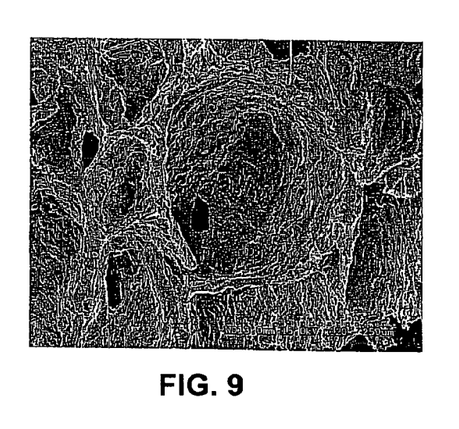
FIG. 9 depicts a scanning electron microscope picture of the cell structure of a wheat crisp.

FIG. 7 shows a plurality of wheat crisps made according to this example. FIG. 8 shows a SEM micrograph at 50 μm magnification showing a substantially uniform cell structure in a wheat crisp. By "substantially uniform" it is meant that the cell structure has a substantially uniform distribution of cell sizes and cell wall thicknesses throughout a unit volume, and that mixing of ingredients has occurred to substantial homogeneity such that there is little or no apparent transition of protein to starch material visible at this magnification. FIG. 9 shows a substantially uniform cell structure at 250 μm magnification.

EXAMPLE 3

Wheat Protein+Wheat Flour

A. Extrusion Conditions

Extrusion Profile: #2

Extrusion Temperature in cylindrical head sections 102, 104, 106, and die assembly 126: 45-92-95-92° C.

Extrusion Pressure: 7200 kPa

Extrusion Motor Load: 64%

Extrusion Speed: 350 rpm

Water was added to the dry mix during extrusion through the extruder barrel. The dry feed rate ranged from 105 to 130 kg/hr, and water feed rate ranged from 10 to 26 kg/hr. Vinegar was fed into the extruder preconditioner at approximately 2 kg/hr.

B. Wheat Crisp Recipe

| Ingredient | Percent Wt. |
|---|---|
| Arise 8000 ™ | 60 |
| Wheat Flour (high protein) | 38.296 |
| Sodium Bicarbonate | 0.5 |
| Sodium Aluminum Phosphate | 0.25 |
| Sodium Aluminum Sulfate | 0.25 |
| Calcium Aluminum Phosphate | 0.25 |
| BHA | 0.002 |
| BHT | 0.002 |
| Water | 15% |
| Vinegar | 2% |

C. Final Product Properties

| Property | Value |
|---|---|
| Moisture Content (% wb) | 1.75 |
| Bulk Density (g/cc) – (lb/ft$^3$) | 0.192-12.00 |
| Protein (N × 6.25 as is) | 61.50 |
| TDF (%) | 1.0 |

Figure 10:
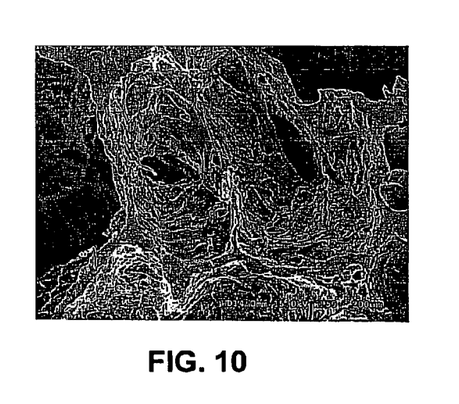
FIG. 10 depicts a scanning electron microscope picture of the cell structure of a wheat crisp.
Figure 11:
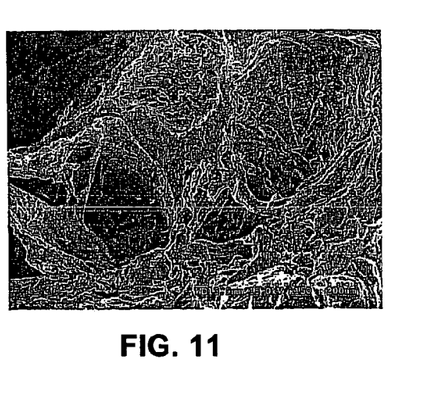
FIG. 11 depicts a scanning electron microscope picture of the cell structure of a wheat crisp.

FIG. 10 shows a SEM micrograph at 200 μm magnification showing a substantially uniform cell structure in a wheat crisp produced in this example. FIG. 11 shows a substantially uniform cell structure at 200 μm magnification from a different locus in the wheat crisp.

EXAMPLE 4

Wheat Protein+Potato Starch

A. Extrusion Conditions
  Extrusion Profile: #2
  Extrusion Temperature in cylindrical head sections 102, 104, 106, and die assembly 126: 45-90-95-92° C.
  Extrusion Pressure: 6890 kPa
  Extrusion Motor Load: 73%
  Extrusion Speed: 350 rpm
  Water was added to the dry mix during extrusion through the extruder barrel. The dry feed rate ranged from 105 to 130 kg/hr, and water feed rate ranged from 10 to 26 kg/hr. Vinegar was fed into the extruder preconditioner at approximately 2 kg/hr.

B. Wheat Crisp Recipe

| Ingredient | Percent Wt. |
|---|---|
| Arise 8000 ™ | 60 |
| Potato Starch | 38.296 |
| Sodium Bicarbonate | 0.5 |
| Sodium Aluminum Phosphate | 0.25 |
| Sodium Aluminum Sulfate | 0.25 |
| Calcium Aluminum Phosphate | 0.25 |
| BHA | 0.002 |
| BHT | 0.002 |
| Water | 15% |
| Vinegar | 2% |

C. Final Product Properties

| Property | Value |
|---|---|
| Moisture Content (% wb) | 1.77 |
| Bulk Density (g/cc) – (lb/ft$^3$) | 0.169-10.58 |
| Protein (N × 6.25 as is) | 59.84 |
| TDF (%) | 0.8 |

Figure 12:
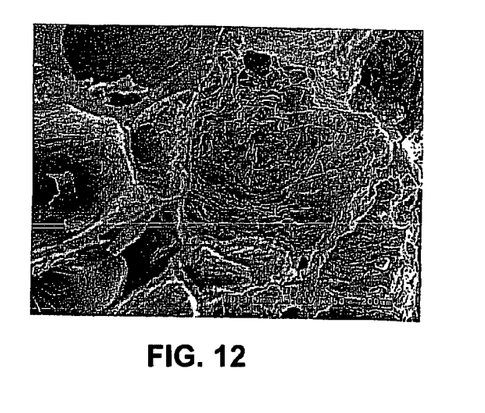
FIG. 12 depicts a scanning electron microscope picture of the cell structure of a wheat crisp.
Figure 13:
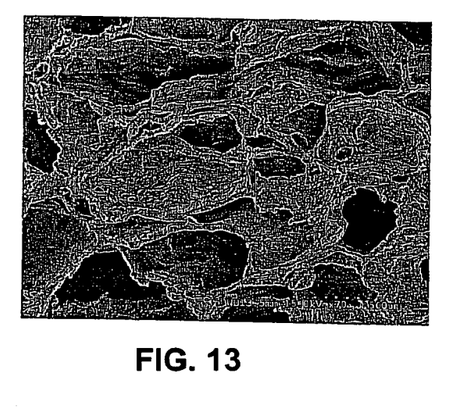
FIG. 13 depicts a scanning electron microscope picture of the cell structure of a wheat crisp.

FIG. 12 shows a SEM micrograph at 200 μm magnification showing a substantially uniform cell structure in a wheat crisp produced according to this example. FIG. 13 shows a substantially uniform cell structure at 500 μm magnification in the wheat crisp.

EXAMPLE 5

Wheat Protein+Modified Wheat Starch

A. Extrusion Conditions
  Extrusion Profile: #2
  Extrusion Temperature in cylindrical head sections 102, 104, 106, and die assembly 126: 45-45-73-77° C.
  Extrusion Pressure: 7567.5 kPa
  Extrusion Motor Load: 76%
  Extrusion Speed: 350 rpm
  Water was added to the dry mix during extrusion through the extruder barrel. The dry feed rate ranged from 105 to 130 kg/hr, and water feed rate ranged from 10 to 26 kg/hr. Vinegar was fed into the extruder preconditioner at approximately 2 kg/hr.

B. Wheat Crisp Recipe

| Ingredient | Percent Wt. |
|---|---|
| Arise 8000 ™ | 60 |
| Midsol 46 ™ | 38.61 |
| Sodium Bicarbonate | 1.0 |
| Sodium Aluminum Phosphate | 0.5 |
| Sodium Aluminum Sulfate | 0.5 |
| Calcium Aluminum Phosphate | 0.5 |
| CoviOx (Vitamin E) | 0.14 |
| Water | 15% |
| Vinegar | 2% |

C. Final Product Properties

| Property | Value |
|---|---|
| Moisture Content | 3.25 |
| Bulk Density (g/cc) – (lb/ft$^3$) | 0.138-8.651 |
| Protein (N × 6.25 as is) | 57.12 |
| TDF | 1.12 |

EXAMPLE 6

Wheat Proteins+Modified Wheat Starch

A. Extrusion Conditions
  Extrusion Profile: #2
  Extrusion Temperature in cylindrical head sections 102, 104, 106, and die assembly 126: 45-91-94-94° C.
  Extrusion Pressure: 645 kPa
  Extrusion Motor Load: 63%
  Extrusion Speed: 400 rpm Water was added to the dry mix during extrusion through the extruder barrel. The dry feed rate ranged from 105 to 130 kg/hr, and water feed rate ranged from 10 to 26 kg/hr. Vinegar was fed into the extruder preconditioner at approximately 2 kg/hr.

B. Wheat Crisp Recipe

| Ingredient | Percent Wt. |
|---|---|
| Arise 8000 ™ | 35 |
| Arise 6000 ™ | 35 |
| Midsol Krisp | 27.496 |
| Sodium Bicarbonate | 1.0 |
| Sodium Aluminum Phosphate | 0.5 |
| Sodium Aluminum Sulfate | 0.5 |
| Calcium Aluminum Phosphate | 0.5 |
| BHA | 0.002 |
| BHT | 0.002 |
| Water | 15% |
| Vinegar | 2% |

C. Final Product Properties

| Property | Value |
|---|---|
| Moisture Content (% wb) | 2.75 |
| Bulk Density (g/cc) – (lb/ft$^3$) | 0.175-10.95 |
| Protein (N × 6.25 as is) | 59.92 |
| TDF (%) | 1.8 |

Figure 14:
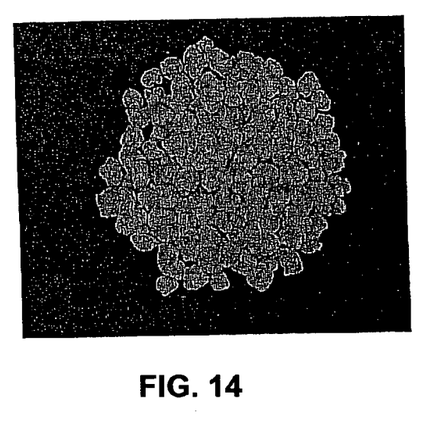
FIG. 14 depicts an assemblage of wheat crisps.
Figure 15:
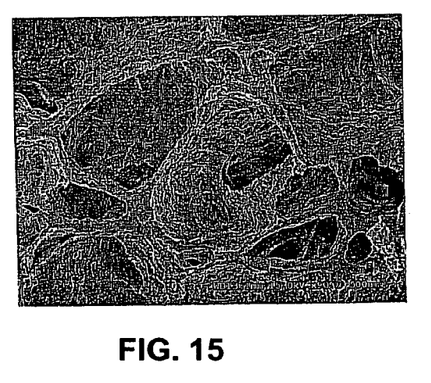
FIG. 15 depicts a scanning electron microscope picture of the cell structure of a wheat crisp.
Figure 16:
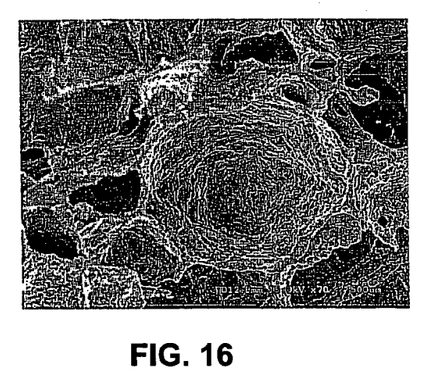
FIG. 16 depicts a scanning electron microscope picture of the cell structure of a wheat crisp.

FIG. 14 shows a plurality of wheat crisps made according to this example. FIG. 15 shows a SEM micrograph at 500 μm magnification showing a substantially uniform cell structure in a wheat crisp. FIG. 16 shows a substantially uniform cell structure at 500 μm magnification.

EXAMPLE 7

Wheat Protein+Modified Wheat Starches

A. Extrusion Conditions

Extrusion Profile: #2

Extrusion Temperature in cylindrical head sections 102, 104, 106, and die assembly 126: 46-46-74-72° C.

Extrusion Pressure: 7439.7 kPa

Extrusion Motor Load: 71%

Extruder Speed: 400 rpm

Water was added to the dry mix during extrusion through the extruder barrel. The dry feed rate ranged from 105 to 130 kg/hr, and water feed rate ranged from 10 to 26 kg/hr. Vinegar was fed into the extruder preconditioner at approximately 2 kg/hr.

B. Wheat Crisp Recipe

| Ingredient | Percent Wt. |
|---|---|
| Arise 8000 ™ | 60 |
| Midsol Krisp ™ | 33.61 |
| Fibersym 70 ™ | 5.0 |
| Sodium Bicarbonate | 0.5 |
| Sodium Aluminum Phosphate | 0.25 |
| Sodium Aluminum Sulfate | 0.25 |
| Calcium Aluminum Phosphate | 0.25 |
| CoviOx ™ (Vitamin E) | 0.14 |
| Water | 15% |
| Vinegar | 2% |

C. Final Product Properties

| Property | Value |
|---|---|
| Moisture Content | 2.32 |
| Bulk Density (g/cc) – (lb/ft$^3$) | 0.217-13.57 |
| Protein (N × 6.25 as is) | 51.36 |
| TDF | 4.75 |

EXAMPLE 8

Wheat Protein+Modified Wheat Starches

A. Extrusion Conditions

Extrusion Profile: #2

Extrusion Temperature in cylindrical head sections 102, 104, 106, and die assembly 126: 46-46-74-78° C.

Extrusion Pressure: 6786.2 kPa

Extrusion Motor Load: 70%

Extruder Speed: 400 rpm

Water was added to the dry mix during extrusion through the extruder barrel. The dry feed rate ranged from 105 to 130 kg/hr, and water feed rate ranged from 10 to 26 kg/hr. Vinegar was fed into the extruder preconditioner at approximately 2 kg/hr.

B. Wheat Crisp Recipe

| Ingredient | Percent Wt. |
|---|---|
| Arise 8000 ™ | 60 |
| Midsol Krisp ™ | 28.61 |
| Fibersym 70 ™ | 10.0 |
| Sodium Bicarbonate | 1.0 |
| Sodium Aluminum Phosphate | 0.5 |
| Sodium Aluminum Sulfate | 0.5 |
| Calcium Aluminum Phosphate | 0.5 |
| CoviOx (Vitamin E) | 0.14 |
| Water | 15% |
| Vinegar | 2% |

C. Final Product Properties

| Property | Value |
|---|---|
| Moisture Content | 1.88 |
| Bulk Density (g/cc) – (lb/ft$^3$) | 0.227-14.19 |
| Protein (N × 6.25 as is) | 51.61 |
| TDF | 7.54 |

EXAMPLE 9

Wheat Protein+Modified Wheat Starches

A. Extrusion Conditions
  Extrusion Profile: #2
  Extrusion Temperature in cylindrical head sections 102, 104, 106, and die assembly 126: 46-46-77-81° C.
  Extrusion Pressure: 8601.05 kPa
  Extrusion Motor Load: 81%
  Extrusion Speed: 400 rpm
  Water was added to the dry mix during extrusion through the extruder barrel. The dry feed rate ranged from 105 to 130 kg/hr, and water feed rate ranged from 10 to 26 kg/hr. Vinegar was fed into the extruder preconditioner at approximately 2 kg/hr.

B. Wheat Crisp Recipe

| Ingredient | Percent Wt. |
|---|---|
| Arise 8000 ™ | 64.36 |
| Midsol Krisp ™ | 26.35 |
| Midsol 46 ™ | 7.92 |
| Sodium Bicarbonate | 0.5 |
| Sodium Aluminum Phosphate | 0.25 |
| Sodium Aluminum Sulfate | 0.25 |
| Calcium Aluminum Phosphate | 0.25 |
| CoviOx (Vitamin E) | 0.14 |
| Water | 15% |
| Vinegar | 2% |

C. Final Product Properties

| Property | Value |
|---|---|
| Moisture Content | 1.98 |
| Bulk Density (g/cc) – (lb/ft$^3$) | 0.2098-13.1 |
| Protein (N × 6.25 as is) | 56.27 |
| TDF | 1.27 |

EXAMPLE 10

Wheat Protein+Modified Wheat Starch

A. Extrusion Conditions
  Extrusion Profile: #2
  Extrusion Temperature in cylindrical head sections 102, 104, 106, and die assembly 126: 48-48-72-78° C.
  Extrusion Pressure: 9139.9 kPa
  Extrusion Motor Load: 75%
  Extrusion Speed: 400 rpm
  Water was added to the dry mix during extrusion through the extruder barrel. The dry feed rate ranged from 105 to 130 kg/hr, and water feed rate ranged from 10 to 26 kg/hr. Vinegar was fed into the extruder preconditioner at approximately 2 kg/hr.

B. Wheat Crisp Recipe

| Ingredient | Percent Wt. |
|---|---|
| Arise 8000 ™ | 70 |
| Midsol Krisp ™ | 28.61 |
| Sodium Bicarbonate | 1.0 |
| Sodium Aluminum Phosphate | 0.5 |
| Sodium Aluminum Sulfate | 0.5 |
| Calcium Aluminum Phosphate | 0.5 |
| CoviOx ™ (Vitamin E) | 0.14 |
| Water | 15% |
| Vinegar | 2% |

C. Final Product Properties

| Property | Value |
|---|---|
| Moisture Content | 1.96 |
| Bulk Density (g/cc) – (lb/ft$^3$) | 0.2500-15.61 |
| Protein (N × 6.25 as is) | 59.67 |
| TDF | 1.11 |

EXAMPLE 11

Wheat Protein+Modified Wheat Starches

A. Extrusion Conditions
  Extrusion Profile: #2
  Extrusion Temperature in cylindrical head sections 102, 104, 106, and die assembly 126: 46-46-74-74° C.
  Extrusion Pressure: 6336.3 kPa
  Extrusion Motor Load: 72%
  Extruder Speed: 400 rpm
  Water was added to the dry mix during extrusion through the extruder barrel. The dry feed rate ranged from 105 to 130 kg/hr, and water feed rate ranged from 10 to 26 kg/hr. Vinegar was fed into the extruder preconditioner at approximately 2 kg/hr.

B. Wheat Crisp Recipe

| Ingredient | Percent Wt. |
|---|---|
| Arise 8000 ™ | 70 |
| Midsol Krisp ™ | 20.61 |
| Fibersym 70 ™ | 5.0 |
| Sodium Bicarbonate | 1.0 |
| Sodium Aluminum Phosphate | 0.5 |
| Sodium Aluminum Sulfate | 0.5 |
| Calcium Aluminum Phosphate | 0.5 |
| CoviOx ™ (Vitamin E) | 0.14 |
| Water | 15% |
| Vinegar | 2% |

C. Final Product Properties

| Property | Value |
|---|---|
| Moisture Content | 2.11 |
| Bulk Density (g/cc) – (lb/ft$^3$) | 0.2704-16.88 |
| Protein (N × 6.25 as is) | 60.8 |
| TDF | 4.31 |

EXAMPLE 12

Wheat Protein+Modified Wheat Starch

A. Extrusion Conditions
   Extrusion Profile: #2
   Extrusion Temperature in cylindrical head sections 102, 104, 106, and die assembly 126: 46-51-75-78° C.
   Extrusion Pressure: 7258.2 kPa
   Extrusion Motor Load: 83%
   Extruder Speed: 400 rpm
   Water was added to the dry mix during extrusion through the extruder barrel. The dry feed rate ranged from 105 to 130 kg/hr, and water feed rate ranged from 10 to 26 kg/hr. Vinegar was fed into the extruder preconditioner at approximately 2 kg/hr.

B. Wheat Crisp Recipe

| Ingredient | Percent Wt. |
|---|---|
| Arise 8000 ™ | 75 |
| Midsol Krisp ™ | 19.36 |
| Sodium Bicarbonate | 1.5 |
| Sodium Aluminum Phosphate | 0.75 |
| Sodium Aluminum Sulfate | 0.75 |
| Calcium Aluminum Phosphate | 0.75 |
| CoviOx ™ (Vitamin E) | 0.14 |
| Water | 15% |
| Vinegar | 2% |

C. Final Product Properties

| Property | Value |
|---|---|
| Moisture Content | 2.23 |
| Bulk Density (g/cc) – (lb/ft$^3$) | 0.3099-19.35 |
| Protein (N × 6.25 as is) | 64.80 |
| TDF | 1.13 |

EXAMPLE 13

Wheat Protein+Rice Protein+Modified Rice Starches

A. Extrusion Conditions
   Extrusion Profile: #2
   Extrusion Temperature in cylindrical head sections 102, 104, 106, and die assembly 126: 46-62-75-69° C.
   Extrusion Pressure: 5326 kPa
   Extrusion Motor Load: 66%
   Extruder Speed: 375 rpm
   Water was added to the dry mix during extrusion through the extruder barrel. The dry feed rate ranged from 105 to 130 kg/hr, and water feed rate ranged from 10 to 26 kg/hr. Vinegar was fed into the extruder preconditioner at approximately 2 kg/hr.

B. Wheat Crisp Recipe

| Ingredient | Percent Wt. |
|---|---|
| Arise 8000 ™ | 40 |
| RemyPro N80+ ™ | 30 |
| Remyline AX-FG-P ™ | 16.86 |
| Remy B7 ™ | 10.0 |
| Sodium Bicarbonate | 1.5 |
| Sodium Aluminum Phosphate | 0.5 |
| Sodium Aluminum Sulfate | 0.5 |
| Calcium Aluminum Phosphate | 0.5 |
| CoviOx ™ (Vitamin E) | 0.14 |
| Water | 15% |
| Vinegar | 2% |

C. Final Product Properties

| Property | Value |
|---|---|
| Moisture Content | 2.48 |
| Bulk Density (g/cc) – (lb/ft$^3$) | 0.2939-18.35 |
| Protein (N × 6.25 as is) | 60.71 |
| TDF | 1.56 |

EXAMPLE 14

Wheat Protein+Soy Protein+Modified Wheat Starch

A. Extrusion Conditions
   Extrusion Profile: #2
   Extrusion Temperature in cylindrical head sections 102, 104, 106, and die assembly 126: 47-59-72-68° C.
   Extrusion Pressure: 55550 kPa
   Extrusion Motor Load: 67%
   Extruder Speed: 380 rpm
   Water was added to the dry mix during extrusion through the extruder barrel. The dry feed rate ranged from 105 to 130 kg/hr, and water feed rate ranged from 10 to 26 kg/hr. Vinegar was fed into the extruder preconditioner at approximately 2 kg/hr.

B. Recipe

| Ingredient | Percent Wt. |
|---|---|
| Arise 8000 ™ | 50.26 |
| Soy Isolate (EX-38 Solae) | 20.10 |
| Midsol Krisp ™ | 27.35 |
| Sodium Bicarbonate | 0.5 |
| Sodium Aluminum Phosphate | 0.25 |
| Sodium Aluminum Sulfate | 0.25 |
| Calcium Aluminum Phosphate | 0.25 |
| Calcium Carbonate | 0.9 |
| CoviOx ™ (Vitamin E) | 0.14 |
| Water | 15% |
| Vinegar | 2% |

C. Final Product Properties

| Property | Value |
|---|---|
| Moisture Content | 2.77 |
| Bulk Density (g/cc) – (lb/ft$^3$) | 0.1887-11.78 |

-continued

| C. Final Product Properties | |
|---|---|
| Property | Value |
| Protein (N × 6.25 as is) | 61.35 |
| TDF | 1.21 |

EXAMPLE 15

Rice Protein+Modified Wheat Starches

A. Extrusion Conditions
Extrusion Profile: #2
Extrusion Temperature in cylindrical head sections 102, 104, 106, and die assembly 126: 45-60-72-70° C.
Extrusion Pressure: 6650.4 kPa
Extrusion Motor Load: 87%
Extruder Speed: 325 rpm
Water was added to the dry mix during extrusion through the extruder barrel. The dry feed rate ranged from 105 to 130 kg/hr, and water feed rate ranged from 10 to 26 kg/hr. Vinegar was fed into the extruder preconditioner at approximately 2 kg/hr.

| B. Recipe | |
|---|---|
| Ingredient | Percent Wt. |
| RemyPro N80+ ™ | 70.00 |
| Midsol Krisp ™ | 18.61 |
| Midsol 46 ™ | 10.00 |
| Sodium Bicarbonate | 0.5 |
| Sodium Aluminum Phosphate | 0.25 |
| Sodium Aluminum Sulfate | 0.25 |
| Calcium Aluminum Phosphate | 0.25 |
| Calcium Carbonate | 0.9 |
| CoviOx ™ (Vitamin E) | 0.14 |
| Water | 15% |
| Vinegar | 2% |

| C. Final Product Properties | |
|---|---|
| Property | Value |
| Moisture Content | 5.45 |
| Bulk Density (g/cc) – (lb/ft³) | 0.1352-8.44 |
| Protein (N × 6.25 as is) | 41.09 |
| TDF | 2.33 |

EXAMPLE 16

Rice Protein+Modified Wheat Starches

A. Extrusion Conditions
Extrusion Profile: #2
Extrusion Temperature in cylindrical head sections 102, 104, 106, and die assembly 126: 45-62-81-74° C.
Extrusion Pressure: 8814.6 kPa
Extrusion Motor Load: 77%
Extruder Speed: 350 rpm
Water was added to the dry mix during extrusion through the extruder barrel. The dry feed rate ranged from 105 to 130 kg/hr, and water feed rate ranged from 10 to 26 kg/hr. Vinegar was fed into the extruder preconditioner at approximately 2 kg/hr.

| B. Recipe | |
|---|---|
| Ingredient | Percent Wt. |
| RemyPro N80+ ™ | 80.00 |
| Midsol Krisp ™ | 8.61 |
| Midsol 46 ™ | 10.00 |
| Sodium Bicarbonate | 0.5 |
| Sodium Aluminum Phosphate | 0.25 |
| Sodium Aluminum Sulfate | 0.25 |
| Calcium Aluminum Phosphate | 0.25 |
| Calcium Carbonate | 0.9 |
| CoviOx ™ (Vitamin E) | 0.14 |
| Water | 15% |
| Vinegar | 2% |

| C. Final Product Properties | |
|---|---|
| Property | Value |
| Moisture Content | 2.63 |
| Bulk Density (g/cc) – (lb/ft³) | 0.1852-11.56 |
| Protein (N × 6.25 as is) | 54.91 |
| TDF | 1.68 |

Those skilled in the art will appreciate that the foregoing discussion teaches by way of example, not by limitation. The disclosed instrumentalities set forth preferred methods and materials, and may not be narrowly construed to impose undue limitations on the invention. The scope of the inventor's patentable inventions is defined by the claims, nothing else. Furthermore, the inventors hereby state their intention to rely upon the Doctrine of Equivalents to protect the full scope of their rights in what is claimed.

We claim:
1. An expanded food product comprising:
   a total protein content of 90% by weight, the total protein content including a majority wheat protein component;
   a density ranging from 0.1 to 0.4 g/cc;
   a cross-linked hydroxypropylated starch mixed to substantial homogeneity with the protein in an effective amount to provide uniform cell structure; and
   less than 8% water by weight.
2. The expanded food product of claim 1, wherein the total protein content consists essentially of wheat protein.
3. The expanded food product of claim 1, wherein the total protein content includes a protein selected from the group consisting of soy, rice, corn, and whey proteins and combinations thereof.
4. The expanded food product of claim 1, wherein the product includes native starch.
5. The expanded food product of claim 4, wherein the native starch includes more than about 10% by weight of a starch selected from the group consisting of tuber starch, rice starch, corn starch, wheat starch and combinations thereof.
6. A mixture of ingredients for use in making an expanded food product comprising:
   a total protein content of 90% by weight of dry ingredients, the total protein content including a majority wheat protein component;
   a density ranging from 0.13 to 2.3 g/cc;

a cross-linked hydroxypropylated starch mixed to substantial homogeneity with the protein in an effective amount to provide uniform cell structure; and less than 8% water by weight of dry ingredients.

7. The mixture of claim 6, wherein the total protein content consists essentially of wheat protein.

8. The mixture of claim 6, wherein the total protein content includes a protein selected from the group consisting of soy, rice, corn, and whey proteins and combinations thereof.

9. The mixture of claim 6, wherein the mixture includes native starch.

10. The mixture of claim 9, wherein the native starch includes more than about 10% by weight of starch selected from the group consisting of tuber starch, rice starch, corn starch, wheat starch and combinations thereof.

11. The mixture of claim 6, wherein the mixture further includes a chemically modified starch.

12. The mixture of claim 6, wherein the resistant starch is a reversible swellable resistant starch.

13. The mixture of claim 6, further comprising an expansion agent.

14. The mixture of claim 6, further comprising a dough strength enhancer.

15. The mixture of claim 6, wherein the mixture is extruded.

16. The mixture of claim 15, wherein the mixture is extruded under pressure ranging from 350 to 1200 psi.

17. The mixture of claim 15, wherein temperature of the mixture is controlled at a level of about 120° C. or less.

* * * * *